(12) United States Patent
Zirphile

(10) Patent No.: US 10,314,027 B2
(45) Date of Patent: Jun. 4, 2019

(54) METHOD FOR TRANSMITTING AND RECEIVING DOWNLINK MESSAGES WITH IMPLICIT IDENTIFICATION OF RECIPIENTS

(71) Applicant: SIGFOX, Labege (FR)

(72) Inventor: Lionel Zirphile, Ramonville Saint Agne (FR)

(73) Assignee: SIGFOX, Labege (FR)

( * ) Notice: Subject to any disclaimer, the term of this patent is extended or adjusted under 35 U.S.C. 154(b) by 0 days.

(21) Appl. No.: 15/551,277

(22) PCT Filed: Feb. 19, 2016

(86) PCT No.: PCT/FR2016/050387
§ 371 (c)(1),
(2) Date: Aug. 15, 2017

(87) PCT Pub. No.: WO2016/132084
PCT Pub. Date: Aug. 25, 2016

(65) Prior Publication Data
US 2018/0035412 A1 Feb. 1, 2018

(30) Foreign Application Priority Data
Feb. 19, 2015 (FR) ...................................... 15 51392

(51) Int. Cl.
*H04L 1/00* (2006.01)
*H04W 72/04* (2009.01)
(Continued)

(52) U.S. Cl.
CPC ......... *H04W 72/042* (2013.01); *H04L 1/0061* (2013.01); *H04W 4/70* (2018.02); *H04W 88/02* (2013.01); *H04W 88/08* (2013.01)

(58) Field of Classification Search
CPC .... H04L 1/0061; H04W 4/70; H04W 72/042; H04W 88/02; H04W 88/08
See application file for complete search history.

(56) References Cited

U.S. PATENT DOCUMENTS

2004/0010746 A1* 1/2004 Lucas ................... H04L 1/0045
714/781
2011/0164572 A1* 7/2011 Kim ....................... H04B 7/024
370/328

(Continued)

FOREIGN PATENT DOCUMENTS

WO 2014/075239 A1 5/2014

*Primary Examiner* — Mohamed A Kamara
(74) *Attorney, Agent, or Firm* — Im IP Law; C. Andrew Im; Chai Im

(57) ABSTRACT

A method for transmitting a downlink message on a downlink between an access network and a plurality of terminals. The downlink message includes main data to be transmitted to a receiving terminal. Error detection data is generated from the main data. Main data and/or error-detection data are modified on the basis of an identifier of the receiving terminal, using a predefined reversible modification function. The modification is performed at a constant spectral width and for a constant duration with respect to the aforementioned main data and/or error-detection data. A downlink message including the main data and the error-detection data obtained after modification are transmitted. Also, a method for receiving the downlink messages.

15 Claims, 1 Drawing Sheet

(51) Int. Cl.
*H04W 4/70* (2018.01)
*H04W 88/02* (2009.01)
*H04W 88/08* (2009.01)

(56) References Cited

U.S. PATENT DOCUMENTS

2013/0077583 A1* 3/2013 Kim .................... H04W 72/042
370/329
2013/0077594 A1   3/2013 Park et al.
2015/0245340 A1   8/2015 Cheng et al.

* cited by examiner

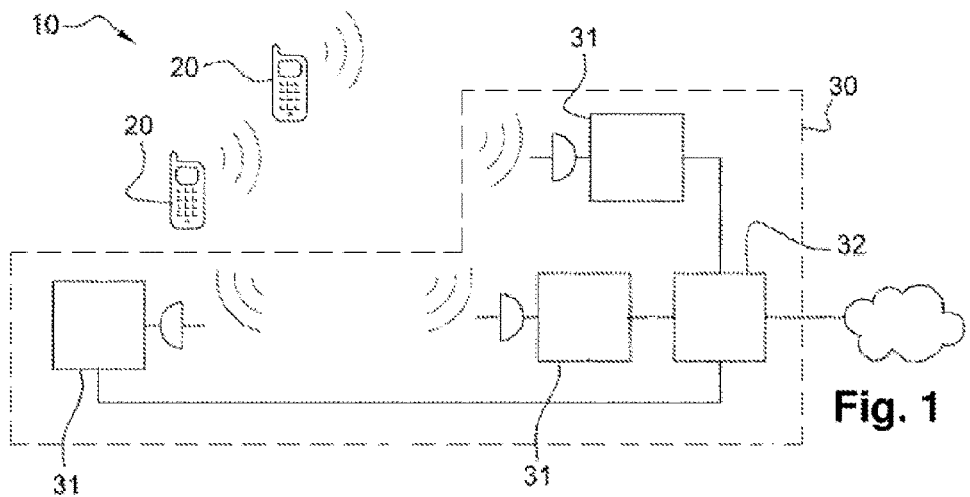
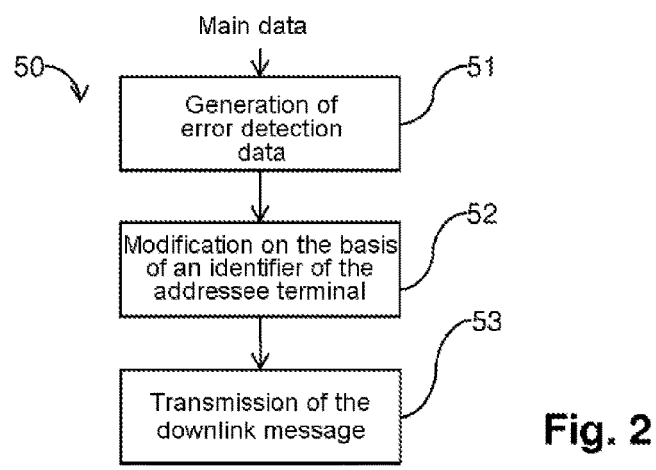
Fig. 2
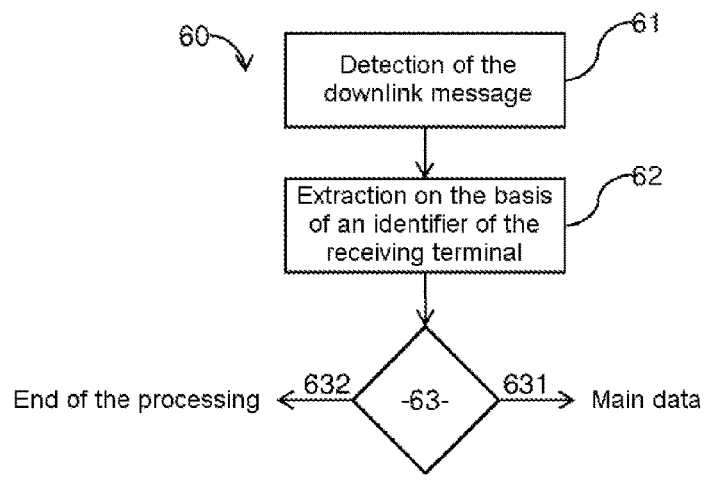
Fig. 3

METHOD FOR TRANSMITTING AND RECEIVING DOWNLINK MESSAGES WITH IMPLICIT IDENTIFICATION OF RECIPIENTS

RELATED APPLICATIONS

This application is a § 371 application from PCT/FR2016/050387 filed Feb. 19, 2016, which claims priority from French Patent Application No. 15 51392 filed Feb. 19, 2015, each of which is incorporated herein by reference in its entirety.

TECHNICAL FIELD

The present invention belongs to the field of digital telecommunications, and more particularly concerns a method for transmitting a downlink message on a downlink between an access network and terminals, and a method for receiving said downlink message.

BACKGROUND OF THE INVENTION

The present invention is used particularly advantageously, albeit without any kind of limitation, in ultra narrow band wireless communication systems. "Ultra Narrow band" (UNB) is understood to mean that the instantaneous frequency spectrum of the radio signals transmitted by the terminals has a frequency width of less than one kilohertz.

Such UNB wireless communication systems are particularly suitable for applications of M2M (Machine-to-Machine) type or of "Internet of Things" (IoT) type.

In such a UNB wireless communication system, data exchanges are essentially unidirectional, in this case on an uplink between terminals and an access network of said system.

The terminals transmit uplink messages that are collected by base stations of the access network, without having to previously associate themselves with one or more base stations of the access network. In other words, the uplink messages transmitted by a terminal are not intended for one specific base station of the access network, and the terminal transmits its uplink messages supposing that they will be able to be received by at least one base station. Such arrangements are advantageous in that the terminal does not need to make regular measurements, which are intensive particularly from the point of view of power consumption, in order to determine the most appropriate base station to receive its uplink messages. The complexity is on the access network, which has to be capable of receiving uplink messages that can be transmitted at arbitrary instants and on arbitrary center frequencies. Each base station of the access network receives uplink messages from the various terminals that are within its range.

Such a mode of operation, in which the data exchanges are essentially unidirectional, is entirely satisfactory for many applications, such as, by way of example, remote reading of gas, water and electricity meters, remote surveillance of buildings or houses, etc.

In some applications, however, it may be advantageous to be able also to exchange data in the other direction, namely on a downlink from the access network to the terminals, for example in order to reconfigure a terminal and/or control an actuator connected to said terminal. However, it is desirable to provide such a capability while limiting the impact on collection of uplink messages.

In particular, in such UNB wireless communication systems, bit rates are low by construction, generally between a few tens of bits per second and a few kilobits per second. Therefore, even if the number of bits to be transmitted in a downlink message is small, the duration of said downlink message may be non-negligible, in the order of one second.

Therefore, it is necessary to limit the number of bits in the downlink messages in order to reduce the duration thereof, and therefore to reduce the duration of occupation of the frequency band used to exchange data between the terminals and the access network.

Such limitation of the number of bits in the downlink messages is also desired on account of the fact that, in order to reduce the cost of deploying the access network, the use of half-duplex base stations is envisaged, that is to say base stations that can receive uplink messages and transmit downlink messages, but not simultaneously. By limiting the duration of the downlink messages, the time during which the base stations cannot receive uplink messages would also be reduced.

Within the context of LTE (Long Term Evolution) wireless communication systems, patent applications US 2013/077583 A1 and WO 2014/075239 A1 disclose the practice of scrambling the data to be transmitted using an identifier of the addressee terminal. The identifier of the addressee terminal is therefore not explicitly transmitted, allowing the number of bits transmitted to be reduced.

However, patent applications US 2013/077583 A1 and WO 2014/075239 A1 rely on the mechanisms of the LTE access network for managing the identifiers of the terminals, which are difficult to implement in an access network in which the aim is to reduce complexity.

SUMMARY OF THE INVENTION

The object of the present invention is to overcome all or some of the limitations of the prior art solutions, particularly those outlined above, by providing a solution that allows the duration of the downlink messages transmitted by the base stations of the access network to be limited.

To this end, and according to a first aspect, the invention concerns a method for transmitting a downlink message on a downlink between an access network and a plurality of terminals, said downlink message being formed from main data to be transmitted to an addressee terminal, said method comprising steps of:
  generation of error detection data from the main data,
  modification of the main data and/or of the error detection data on the basis of an identifier of said addressee terminal, by means of a predefined reversible modification function, said modification being made at a constant spectral width and at a constant duration in relation to said main data and/or error detection data,
  transmission, by a base station of the access network, of a downlink message comprising the main data and the error detection data obtained after modification.

Moreover, said downlink message being transmitted in response to an uplink message previously received from the addressee terminal, the identifier of said addressee terminal is a temporary identifier determined from control data included in said uplink message.

Thus, according to the invention, the identifier of the addressee terminal is used to modify the main data and/or the error detection data without increasing the spectral width thereof and without increasing the duration thereof. Therefore, the identifier of the addressee terminal is not explicitly transmitted in the downlink message. Specifically, the downlink message does not comprise a field in which a receiving terminal can directly find the identifier of the addressee terminal. In relation to conventional solutions that involve adding the identifier of the addressee terminal to the transmitted data, generally as a preamble, the duration of the downlink messages is reduced by the duration of the addressee terminal identifier.

Such a reduction in the duration of the downlink messages is, however, accompanied by an increase in the quantity of processing operations to be performed by the various terminals. Specifically, when a receiving terminal receives a downlink message, said receiving terminal must first of all, before knowing whether said downlink message is intended for it, modify said downlink message on the basis of its identifier, by means of a function that is inverse of the modification function used on transmission, and then check by means of the error detection data whether the main data contain errors. If the identifier of the receiving terminal is different than the identifier of the addressee terminal, then the main data extracted by the receiving terminal will comprise errors, which will be detected by virtue of the error detection data, and the receiving terminal will consider the downlink message not to be intended for it.

However, the increase in the quantity of processing operations to be performed by the terminals can be limited, if necessary, by limiting the number of downlink messages likely to be detected by each terminal.

Since the identifier to be used for an addressee terminal is a temporary identifier that is determined from control data extracted from the uplink message in response to which the downlink message has to be transmitted, the access network does not need to store identifiers for all terminals that are in its coverage area. Such arrangements therefore allow the complexity of said access network to be reduced.

In particular implementations, the transmission method can moreover comprise one or more of the following features, taken in isolation or according to all technically possible combinations.

In particular implementations, the identifier of the addressee terminal is obtained by shifting a predefined identification code, the same identification code being used for each terminal, the shift to be applied being determined on the basis of control data included in the uplink message in response to which the downlink message has to be transmitted.

Such arrangements are advantageous in that the access network can store only, for all terminals in its coverage area, a single same identification code that is used for all terminals. The identifier to be used for an addressee terminal is then determined on the basis of the identification code, which is common to all terminals, and on the basis of control data extracted from the uplink message in response to which the downlink message is transmitted, control data that, in principle, allow said addressee terminal to be distinguished from the other terminals.

In particular implementations, the identification code is a pseudorandom sequence generated by means of a predefined pseudorandom number generator, the determined shift being used as a seed for said pseudorandom number generator.

In particular implementations, the control data used to determine the identifier of the addressee terminal comprise a sequence number of the uplink message.

In particular implementations, the main data, the error detection data and the identifier of the addressee terminal being binary symbol sequences, the modification corresponds to a symbol-by-symbol combination by means of an "exclusive or" function.

In particular implementations, the downlink message is transmitted during a time window predetermined in relation to an uplink message previously received from said addressee terminal.

In particular implementations, the downlink message is transmitted on a center frequency predetermined in relation to a center frequency of an uplink message previously received from said addressee terminal.

According to a second aspect, the present invention concerns a base station comprising means configured to implement a transmission method according to any one of the implementations of the invention.

According to a third aspect, the present invention concerns an access network comprising means configured to implement a transmission method according to any one of the implementations of the invention.

According to a fourth aspect, the present invention concerns a method for receiving, by a receiving terminal, a downlink message transmitted in accordance with a transmission method according to any one of the implementations of the invention. More particularly, the reception method comprises steps of:
  detection of the downlink message on the downlink,
  extraction of main data and error detection data by modification of the downlink message on the basis of an identifier of the receiving terminal, by means of a function that is the inverse of the modification function used to form the downlink message, the identifier of the receiving terminal being a temporary identifier determined from control data included in an uplink message previously transmitted by said receiving terminal, in response to which a downlink message has to be transmitted,
  determination, on the basis of the error detection data, of whether the main data comprise errors, the receiving terminal being considered to be the addressee terminal for said downlink message when the main data are considered not to comprise errors.

In particular implementations, the reception method can moreover comprise one or more of the following features, taken in isolation or according to all technically possible combinations.

In particular implementations, the receiving terminal listens to the downlink during a time window, referred to as a "listening window", predetermined in relation to the uplink message previously transmitted by said receiving terminal.

Such arrangements make it possible to limit the number of downlink messages likely to be detected by the receiving terminal, and therefore the quantity of unnecessary processing operations likely to be performed by said receiving terminal. Specifically, as the receiving terminal listens to the downlink only during the listening window of limited duration, only the downlink messages transmitted during this listening window will be likely to be detected.

In particular implementations, the receiving terminal listens to the downlink around a center frequency predetermined in relation to a center frequency of the uplink message previously transmitted by said receiving terminal.

Such arrangements make it possible to limit the number of downlink messages likely to be detected by the receiving terminal, and therefore the quantity of unnecessary processing operations likely to be performed by said receiving terminal. Specifically, as the receiving terminal listens to the downlink only over a frequency band of limited width, only the downlink messages transmitted in this frequency band will be likely to be detected.

In particular implementations, the identifier of the receiving terminal is obtained by shifting a predefined identification code, the same identification code being used for each terminal, the shift to be applied being determined on the basis of control data included in the uplink message in response to which a downlink message has to be transmitted.

In particular implementations, the control data used to determine the identifier of the receiving terminal comprise a sequence number of the uplink message.

According to a fifth aspect, the present invention concerns a terminal comprising means configured to implement a reception method according to any one of the implementations of the invention.

BRIEF DESCRIPTION OF THE DRAWINGS

The invention will be better understood on reading the description that follows, provided by way of non-limiting example, and produced with reference to the figures, in which:

FIG. 1: shows a schematic representation of a wireless communication system,

FIG. 2: shows a chart illustrating the main steps of a method for transmitting a downlink message, FIG. 3: shows a chart illustrating the main steps of a method for receiving a downlink message.

In these figures, references that are identical from one figure to another denote identical or analogous elements. For reasons of clarity, the elements represented are not to scale, unless stated otherwise.

DETAILED DESCRIPTION OF EMBODIMENTS

FIG. 1 schematically shows a wireless communication system 10, for example of UNB type, comprising multiple terminals 20 and an access network 30 comprising multiple base stations 31.

The terminals 20 and the base stations 31 of the access network 30 exchange data in the form of radio signals. A "radio signal" is understood to mean an electromagnetic wave propagating via wireless means, the frequencies of which are included in the traditional spectrum of radio waves (a few hertz to several hundred gigahertz).

The terminals 20 are suitable for transmitting uplink messages on an uplink to the access network 30. The uplink messages are transmitted asynchronously, for example. "Transmitting asynchronously" is understood to mean that the terminals 20 autonomously determine when they transmit, without coordinating said terminals 20 among one another and with the base stations 31 of the access network 30.

Each base station 31 is suitable for receiving the uplink messages from the terminals 20 that are within its range. Each uplink message received in this manner is transmitted to a server 32 of the access network 30, for example, possibly accompanied by other information such as an identifier of the base station 31 that has received it, the measured power of said received uplink message, the date of reception of said uplink message, etc. The server 32 processes all of the uplink messages received from the various base stations 31, for example.

Moreover, the access network 30 is also suitable for transmitting, via the base stations 31, downlink messages on a downlink to the terminals 20, which are suitable for receiving them. The downlink messages are transmitted on the initiative of the access network 30, for example. In such a case, the terminals 20 must continually listen to the downlink, in expectation of a possible downlink message. The access network 30 can also transmit a downlink message in response to each received uplink message, or else transmit downlink messages only in response to certain uplink messages. By way of example, the access network 30 may respond only after having received a predefined number of uplink messages from one and the same terminal 20, or may respond only to uplink messages comprising a request to this end, etc.

In the remainder of the description, it will be assumed in a non-limiting manner that the access network 30 transmits downlink messages only in response to all or some of the uplink messages transmitted by terminals 20, so that the terminals 20 have, in principle, to listen to the downlink, in expectation of a downlink message, only after having transmitted an uplink message to the access network 30.

In order to reduce the cost of deploying the access network 30, the base stations 31 may be of half-duplex type. In other words, these base stations 31 can receive uplink messages and transmit downlink messages, but not simultaneously. Thus, each base station 31 may alternatively be put into:

a reception mode, in which said base station 31 can receive uplink messages during a reception window but cannot transmit downlink messages, a transmission mode, in which said base station 31 can transmit downlink messages during a transmission window but cannot receive uplink messages.

In the remainder of the description, it will be assumed in a non-limiting manner that each terminal 20 can receive a downlink message only during a time window, referred to as a "listening window", predetermined in relation to the last uplink message transmitted by said terminal 20.

Since they do not have to transmit and receive simultaneously, such terminals 20 are, in preferred embodiments, of half-duplex type, in order to reduce the costs of manufacture thereof.

The listening window of a terminal 20 can start immediately after having transmitted an uplink message, particularly if the response times of the access network 30 are short. However, in preferred embodiments, each terminal 20, after having transmitted an uplink message, is configured to switch to a standby mode during a standby window of predetermined duration that is also known to the access network 30. Conventionally, the standby mode is a mode of operation optimized to reduce power consumption, in which said terminal 20 may in particular neither receive downlink messages nor transmit uplink messages. By way of example, the duration of the standby window is chosen to be greater than or equal to the minimum response time of the access network 30.

After the standby window, the terminal 20 leaves the standby mode in order to listen to the downlink in expectation of a downlink message, during a listening window of predetermined duration greater than or equal to the duration of the downlink message that has to be received from the access network. Since the terminal 20 listens to the downlink only during a listening window of limited duration, the number of downlink messages likely to be detected by said terminal 20, including downlink messages that are not intended for it, is greatly reduced in relation to the case in which the terminal 20 could receive downlink messages at any time.

It should be noted that if a terminal 20 knows a priori that no downlink message will be transmitted by the access network 30 (for example because the uplink message that it transmitted did not comprise a request to that effect), then said terminal 20 does not listen to the downlink, and preferably remains in standby mode, for example until the next uplink message is transmitted.

When a terminal 20 listens to the downlink in expectation of a downlink message, it can listen to a frequency band of greater or lesser width. If the terminal 20 does not know a priori the center frequency on which the downlink has to be transmitted, it has to listen to all possible center frequencies for the downlink.

In the remainder of the description, it will be assumed in a non-limiting manner that each terminal 20, when it has to receive a downlink message, knows a priori the center frequency on which this downlink message will be transmitted. Thus, the terminal 20 can listen to a frequency band centered on this center frequency, of limited width of the order of the spectral width of the downlink message, for example twice as great as the spectral width of said downlink message (in order to take account of an imprecision on the synthesis of the center frequency, of the frequency drift of the frequency synthesis means, of any Doppler effect, etc.). Since the terminal 20 listens to the downlink only over a frequency band of limited width, the number of downlink messages likely to be detected by said terminal 20, including downlink messages that are not intended for it, is greatly reduced in relation to the case in which the terminal 20 could receive downlink messages on any center frequency of the downlink.

In preferred implementations, the center frequency of the downlink message is determined from the center frequency of the uplink message in response to which said downlink message has to be transmitted. Therefore, on the access network 30, the center frequency of the uplink message is measured, and the center frequency on which the downlink message has to be transmitted is determined on the basis of the measurement of the center frequency of the uplink message, for example on the basis of a predefined frequency shift for the terminal having transmitted the uplink message.

A) Method for Transmitting a Downlink Message

FIG. 2 schematically shows the main steps of a method 50 for transmitting a downlink message to a particular terminal 20 among all terminals, which is referred to as an "addressee terminal".

As illustrated by FIG. 2, the transmission method 50 comprises mainly the following steps, which will be described in more detail below:
- 51 generation of error detection data from main data intended for the addressee terminal 20,
- 52 modification of the main data and/or of the error detection data on the basis of an identifier of said addressee terminal 20,
- 53 transmission, by a base station 31 of the access network 30, of a downlink message comprising the main data and the error detection data obtained after modification.

Among the various steps illustrated by FIG. 2, only step 53 of transmission of the downlink message necessarily has to be executed at least in part by a base station 31. The other steps illustrated by FIG. 2 can be executed by a base station 31 and/or by the server 32 of the access network 30. In particular, all steps illustrated by FIG. 2 can be executed by the base station 31 used for transmitting the downlink message on the downlink.

In the remainder of the description, it will be assumed in a non-limiting manner that generation step 51 and modification step 52 are executed by the server 32, which then transmits the main data and the error detection data obtained after modification to the base station 31, which then executes transmission step 53.

In this case, the base stations 31 and the server 32 comprise respective processing modules (not shown in the figures), each processing module comprising, by way of example, one or more processors and storage means (magnetic hard disk, electronic memory, optical disk, etc.) that store a computer program product, in the form of a set of program code instructions to be executed in order to implement the various steps of the transmission method 50. In a variant, each processing module comprises one or more programmable logic circuits, of FPGA, PLD, etc. type, and/or specialized integrated circuits (ASICs) suitable for implementing all or some of said steps of the transmission method 50.

Each base station 31 moreover comprises wireless communication means, which are considered to be known to a person skilled in the art, allowing said base station to receive uplink messages and to transmit downlink messages. The base stations 31 and the server 32 also comprise respective network communication means, which are considered to be known to a person skilled in the art, allowing the server 32 to exchange data with each base station 31.

In other words, the access network 30 comprises a set of means configured by software (specific computer program product) and/or hardware (FPGA, PLD, ASIC, etc.) in order to implement the various steps of the transmission method 50.

A more detailed description is now provided of non-limiting examples of implementation of generation step 51, modification step 52 and transmission step 53.

A.1) Step of Generation of Error Detection Data

The main data are, from the point of view of protocol layers of communication systems, data at physical layer level.

Conventionally, the main data can comprise useful data and control data that can be used to decode said useful data. The useful data may be of any known type, and originate in principle from protocol layers above the physical layer, which depart from the scope of the invention. The control data, added to the useful data on the physical layer, may also be of any known type, with the exception that they do not comprise an identifier of the addressee terminal 20.

Step 51 aims to generate error detection data from the main data to be transmitted to the addressee terminal 20. The error detection data aim to allow checking, on each terminal 20, of the integrity of the main data extracted from a downlink message.

Said error detection data can be obtained using any method known to a person skilled in the art, for example by means of a cyclic redundancy check (CRC), by means of a hash function, etc.

Conventionally, the same method is then used on each terminal 20 to obtain, from the main data extracted from the downlink message, error detection data that are compared with those extracted from the downlink message in order to check the integrity of said extracted main data.

A.2) Step of Modification of the Main Data and/or the Error Detection Data

During step 52, the main data and/or the error detection data are modified on the basis of an identifier of the addressee terminal 20, by means of a predefined reversible modification function. This modification is moreover made at a constant spectral width and at a constant duration in relation to the main data and/or to the error detection data. In other words, the modification does not increase:

the spectral width of the modified data, namely the main data and/or the error detection data: the modification therefore introduces no spreading of the frequency spectrum of the downlink message in relation to the case in which modification step 52 would not be executed, the duration of the modified data, namely the main data and/or the error detection data: the modification therefore introduces no extension of the duration of the downlink message in relation to the case in which modification step 52 would not be executed.

In the remainder of the description, it will be assumed in a non-limiting manner that the main data and the error detection data are first assembled so as to obtain assembled data. Modification step 52 is therefore executed on the assembled data. Nevertheless, nothing rules out, according to other examples, direct modification of the main data and/or the error detection data, in order possibly to assemble them after modification.

Any method of assembly known to a person skilled in the art can be implemented, and the method of assembly is known to each terminal 20 so as to allow each terminal 20 to separate the main data and the error detection data extracted from a downlink message.

In the remainder of the description, it will be assumed in a non-limiting manner that assembly involves adding the error detection data to the rest of the main data, so that the duration of the assembled data corresponds to the sum of the respective durations of the main data and the error detection data. Nothing rules out, according to other examples, considering other methods of assembly. In particular, if the main data and the error detection data appear in the form of sequences of real (that is to say noncomplex) symbols, then they can be assembled so as to obtain assembled data appearing in the form of a sequence of complex symbols, the real portion of which corresponds to the main data, for example, and the complex portion of which corresponds to the error detection data.

Various modification functions can be implemented, and the choice of a particular modification function is merely a variant implementation of the invention. The modification function must, however, be reversible. "Reversible" is understood to mean that:

for each possible identifier of terminal 20: there is a single sequence of assembled data allowing each possible downlink message to be obtained (the correspondence between the sequences of assembled data and the downlink messages obtained by modification therefore has one-to-one mapping), for each possible sequence of assembled data, the downlink messages obtained on the basis of different identifiers of terminals 20 are necessarily different.

The inverse function of the modification function used during modification step 52 is known to each terminal 20, or can be determined by each terminal 20. "Inverse function" is understood to mean the function that makes it possible to find, from the downlink message, the assembled data actually used to obtain this downlink message, when the identifier under consideration is the same as that used during multiplication step 52. In other words, if F denotes the modification function and G denotes the inverse function, then:

$$G(F(B,ID),ID)=B$$

an expression in which:
B corresponds to the sequence of assembled data,
ID corresponds to the addressee terminal identifier.

Moreover, by construction, we have:

$$G(F(B,ID),ID')\neq B$$

an expression in which ID' corresponds to a terminal identifier different than the identifier ID used during modification step 52.

By way of example, if the assembled data and the identifier of the addressee terminal 20 are sequences of binary symbols, then the modification function for the assembled data can advantageously correspond to a symbol-by-symbol combination between said assembled data and said identifier of the addressee terminal by means of an "exclusive or" function.

Indeed, such a modification function is particularly simple to implement, and moreover has the advantage that the modification function and its inverse function are the same function. Thus, on the addressee terminal 20, the assembled data can be found by combining symbol by symbol the downlink message and the identifier of said addressee terminal 20 by means of an "exclusive or" function.

The identifier of the addressee terminal 20, which is used to modify the assembled data during step 52 of modification of the assembled data, is a temporary identifier, which has to be able to be determined both by the access network 30 and by the addressee terminal 20.

In preferred implementations, the temporary identifier of the addressee terminal 20 is determined from control data extracted from the uplink message previously received from the addressee terminal. By way of example, the control data used to determine said temporary identifier are a permanent identifier of the addressee terminal 20, a sequence number of the uplink message (that is to say an uplink message counter incremented by said addressee terminal 20 on each new transmission of an uplink message), etc.

In preferred implementations, the temporary identifier of the addressee terminal 20 is obtained by shifting a predefined identification code, which is known both to the access network 30 and to the addressee terminal 20. Preferably, the same identification code is used for all terminals 20, which are, where appropriate, distinguished by the shift introduced, which is determined on the basis of control data included in the uplink message previously transmitted by said addressee terminal 20, for example.

"Shifting" the identification code is understood to mean the starting point from which said identification code is handled in order to modify the assembled data. If the end of the identification code is reached before the assembled data has finished being modified, then handling of the identification code is continued by resuming from the beginning of said identification code. Thus, different identifiers are obtained, from the same identification code, by handling said identification code from different starting points.

Preferably, the same computation function for the shift to be applied in order to obtain the temporary identifier is used for all terminals 20, and is therefore known to said terminals 20. By way of example, it is possible to multiply the permanent identifier of the addressee terminal 20 by the sequence number of the uplink message, in response to which the downlink message has to be transmitted, the shift to be applied corresponding to the result of this multiplication modulo the length of the identification code.

In preferred implementations, the identification code is a pseudorandom sequence, for example binary, generated by means of a predefined pseudorandom number generator, and the computed shift is used as a seed for said pseudorandom number generator. If appropriate, on the terminals 20, the same pseudorandom number generator is implemented, and the same computation function for the shift (seed) to be applied is implemented.

A.3) Step of Transmission of the Downlink Message

As indicated above, transmission step 53 is executed at least in part by a base station 31 of the access network. More particularly, multiple operations can possibly be performed on the downlink message, which depart from the scope of the invention.

In particular, the assembled data obtained after modification are in baseband, for example, and the base station 31 can translate them into frequencies in order to transmit the downlink message on a center frequency determined, by way of example, from the measured center frequency of the uplink message in response to which said downlink message has to be transmitted.

B) Method for Receiving the Downlink Message

FIG. 3 schematically shows the main steps of a method 60 for receiving a downlink message transmitted in accordance with any one of the implementations of the transmission method 50 described above. In the remainder of the description, "receiver terminal" denotes the terminal that implements the reception method 60, which does not know a priori whether it is the addressee terminal of the downlink message, given that said reception method 60 can be implemented by each terminal 20.

By way of example, each terminal 20 comprises a processing module (not shown in the figures), comprising one or more processors and storage means (magnetic hard disk, electronic memory, optical disk, etc.) that store a computer program product, in the form of a set of program code instructions to be executed in order to implement the various steps of the reception method 60. In a variant, each processing module comprises one or more programmable logic circuits, of FPGA, PLD, etc. type, and/or specialized integrated circuits (ASICs) suitable for implementing all or some of said steps of the reception method 60. Each terminal 20 moreover comprises wireless communication means, which are considered to be known to a person skilled in the art, allowing said terminal to transmit uplink messages and to receive downlink messages.

In other words, each terminal 20 comprises a set of means configured by software (specific computer program product) and/or hardware (FPGA, PLD, ASIC, etc.) in order to implement the various steps of the reception method 60.

As illustrated by FIG. 3, the reception method 60 first of all comprises a step 61 of detection, by the receiving terminal 20, of the downlink message on the downlink. The main aim of detection step 61 is to find, in a radio signal measured on the downlink, a downlink message transmitted by the access network 30. Any detection method known to a person skilled in the art can be implemented.

The method 60 then comprises a step 62 of extraction of assembled data by modification of the downlink message on the basis of an identifier of the receiving terminal 20, by means of the inverse function of the modification function used on transmission.

By using B to denote the sequence of assembled data that is transmitted by the access network 30, and using ID to denote the identifier of the addressee terminal 20, then if the receiving terminal 20 is the addressee terminal 20, its identifier corresponds to the identifier ID, and the sequence B of assembled data is found (in the absence of transmission errors) using the expression:

$$G(F(B,ID),ID)=B.$$

If, by contrast, the receiving terminal 20 is not the addressee terminal 20, then the identifier of said receiving terminal, denoted by ID', is different than the identifier ID of said addressee terminal. At the conclusion of extraction step 62, a sequence B' of assembled data is obtained, which is different than the sequence B transmitted by the access network 30:

$$G(F(B,ID),ID')=B'\neq B.$$

As indicated above with reference to the transmission method 50, the identifier of the receiving terminal 20 is a temporary identifier, which the receiving terminal 20 determines in the same way as the access network 30, for example on the basis of control data included in the uplink message previously transmitted by said receiving terminal, in response to which a downlink message has to be transmitted.

At the conclusion of extraction step 62, assembled data are therefore available, comprising main data and error detection data that can be separated by the receiving terminal 20, which knows the method of assembly used on transmission.

At this stage, the receiving terminal 20 still does not know whether the downlink message is intended for it. The fact that the receiving terminal 20 can listen to the downlink only during a predetermined listening window and/or around a predetermined center frequency makes it possible to reduce the probability of the receiving terminal 20 detecting multiple downlink messages. However, this does not make it possible to ensure that only the downlink message that is intended for it will be detected. It is therefore necessary to determine, for each downlink message detected by the receiving terminal 20, whether this detected downlink message is intended for it.

To this end, the reception method 60 comprises a step 63 of determination, on the basis of the error detection data, of whether the main data comprise errors. Specifically, if the identifier of the receiving terminal 20 corresponds to the identifier ID of the addressee terminal, then the data sequence formed corresponds to the sequence B transmitted by the access network 30. Therefore, the main data and the error detection data of the sequence B are, by construction, consistent among one another, and no error is detected. By contrast, if the identifier ID' of said receiving terminal is different than the identifier ID of said addressee terminal, then the sequence B' of assembled data is different than the sequence B transmitted by the access network 30. In such a case, the main data and the error detection data extracted from the sequence B' have no reason to be consistent among one another, and errors will be detected in principle.

As illustrated by FIG. 3, when no error is detected (reference 631 in FIG. 3), the receiving terminal 20 is considered to be the addressee terminal for said downlink message, and the processing of the main data is continued, for example in order to extract useful data.

By contrast, when errors are detected (reference 632 in FIG. 3), the receiving terminal 20 is not considered to be the addressee terminal, and the processing of the downlink message can stop.

The invention claimed is:

1. A method for transmitting a downlink message on a downlink between an access network and a plurality of terminals, the downlink message formed from traffic data to be transmitted to an addressee terminal, the method comprising steps of:

generating error detection data from the traffic data;

modifying at least one of the traffic data and the error detection data on a basis of an identifier of the addressee terminal, by a predefined reversible modification function, said modification is made at a constant spectral width and at a constant duration in relation to at least one of the traffic data and the error detection data;

transmitting, by a base station of the access network, the downlink message comprising the traffic data and the error detection data obtained after the modification; and wherein the downlink message is transmitted in response to an uplink message previously received from the addressee terminal, the identifier of the addressee terminal is a temporary identifier determined from control data included in the uplink message.

2. The method as claimed in claim 1, wherein the identifier of the addressee terminal is obtained by shifting a predefined identification code, the predefined identification code is used for all terminals, a shift to be applied is determined on a basis of the control data included in the uplink message.

3. The method as claimed in claim 2, wherein the predefined identification code is a pseudorandom sequence generated by a predefined pseudorandom number generator, the determined shift is used as a seed for the pseudorandom number generator.

4. The method as claimed in claim 1, wherein the control data used to determine the identifier of the addressee terminal comprise a sequence number of the uplink message.

5. The method as claimed in claim 1, wherein the traffic data, the error detection data and the identifier of the addressee terminal are binary symbol sequences, the modification corresponding to a symbol-by-symbol combination by an exclusive or function.

6. The method as claimed in claim 1, wherein the downlink message is transmitted during a time window predetermined in relation to the uplink message previously received from the addressee terminal.

7. The method as claimed in claim 1, wherein the downlink message is transmitted on a center frequency predetermined in relation to a center frequency of the uplink message previously received from the addressee terminal.

8. A base station comprising a processor and a wireless transmitter/receiver, the base station configured to implement the transmission method as claimed in claim 1.

9. An access network comprising a plurality of processor based base stations and a processor based server configured to implement the transmission method as claimed in claim 1.

10. A method for receiving, by a receiving terminal, a downlink message transmitted in accordance with the transmission method as claimed in claim 1, comprising steps of:

detecting the downlink message on the downlink;

extracting the traffic data and the error detection data by modification of the downlink message on the basis of an identifier of the receiving terminal, by a function that is an inverse of the predefined reversible modification function used to form the downlink message, the identifier of the receiving terminal is a temporary identifier determined from the control data included in an uplink message previously transmitted by the receiving terminal, in response to which the downlink message has to be transmitted; and determining, on a basis of the error detection data, whether the traffic data comprise errors, the receiving terminal is considered to be the addressee terminal for the downlink message in response to a determination that the traffic data does not comprise errors.

11. The method as claimed in claim 10, wherein the receiving terminal listens to the downlink during a listening window predetermined in relation to the uplink message previously transmitted by the receiving terminal.

12. The method as claimed in claim 10, wherein the receiving terminal listens to the downlink around a center frequency predetermined in relation to a center frequency of the uplink message previously transmitted by the receiving terminal.

13. The method as claimed in claim 10, wherein the identifier of the receiving terminal is obtained by shifting a predefined identification code, the predefined identification code is used for all receiving terminals, a shift to be applied is determined on a basis of control data included in the uplink message.

14. The method as claimed in claim 10, wherein the control data used to determine the identifier of the receiving terminal comprise a sequence number of the uplink message.

15. A terminal comprising a processor and a wireless transmitter/receiver, the terminal configured to implement the reception method as claimed in claim 10.

* * * * *